July 19, 1960
B. E. HOUSE ET AL
2,945,564
VEHICLE BRAKE
Filed Feb. 15, 1955
2 Sheets-Sheet 2
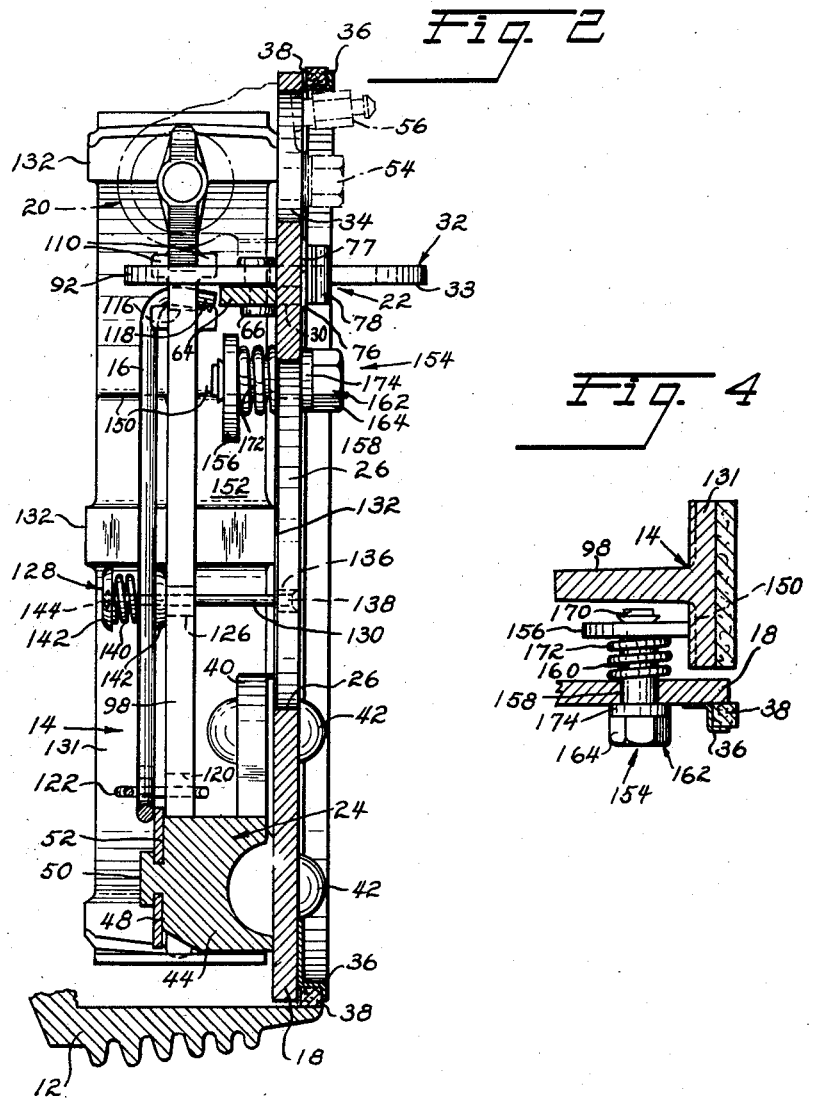
INVENTOR
BRYAN E. HOUSE
RALPH K. SUPER
GEORGE P. MATHEWS
BY Strauch, Nolan & Diggins
ATTORNEYS United States Patent Office 2,945,564
Patented July 19, 1960

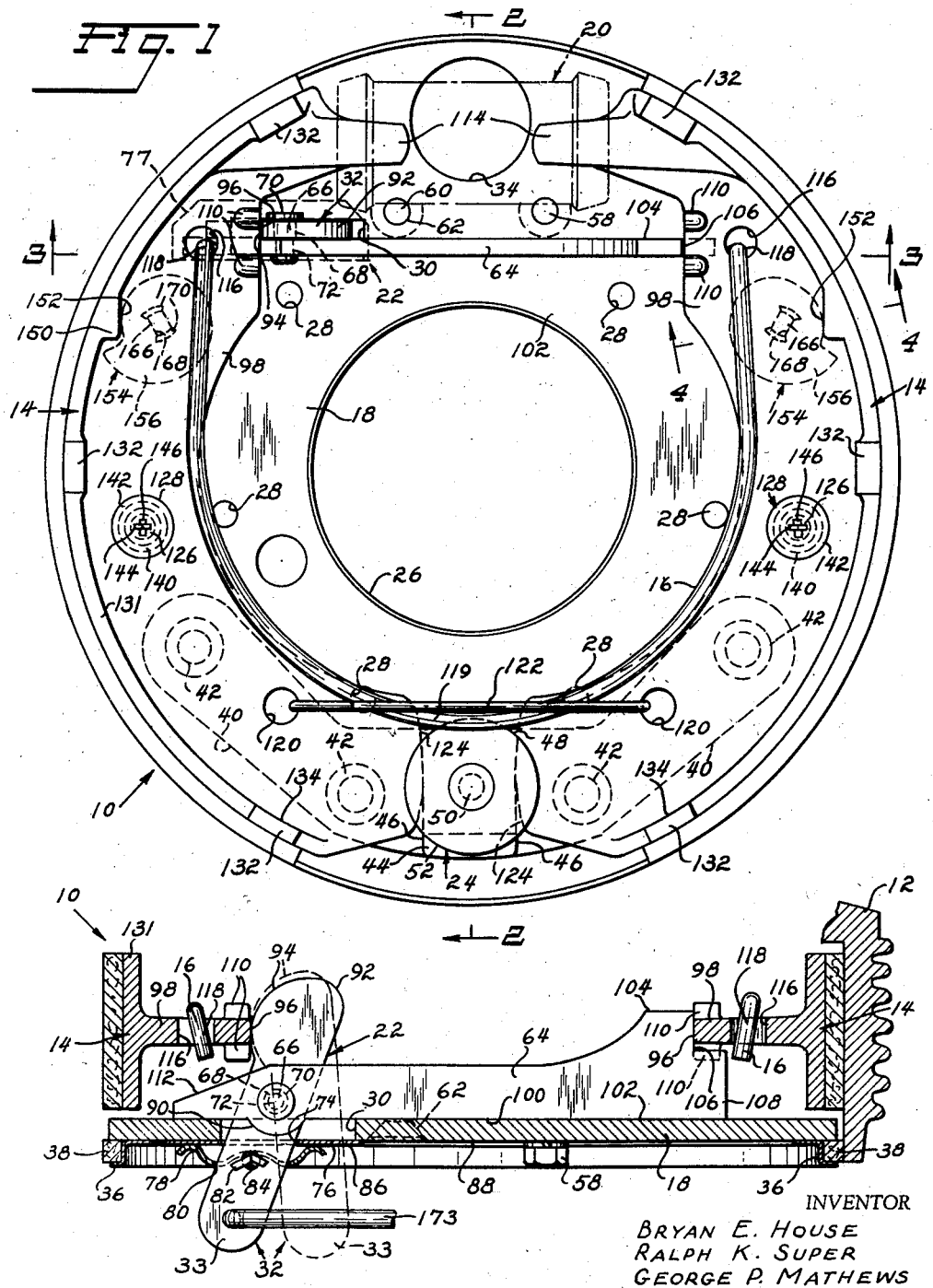

2,945,564

VEHICLE BRAKE

Bryan E. House, Ralph K. Super and George P. Mathews, Ashtabula, Ohio, assignors to Rockwell-Standard Corporation, a corporation of Pennsylvania Filed Feb. 15, 1955, Ser. No. 488,186

4 Claims. (Cl. 188—78)

This invention relates to improvements in vehicle brakes and has particular reference to a small diameter hydraulic brake of high torque output which may readily incorporate mechanism for auxiliary manual mechanical actuation.

The auxiliary mechanical actuating means of this improved brake is a strut and lever assembly, with no positive anchoring connection to the stationary backing plate or the brake shoes, and is full floating and self centering between the shoes. Operation of the auxiliary actuating means will not affect brake shoe adjustment and operation of the hydraulic actuating means will not result in movement of the auxiliary mechanical actuating means. Alignment of the auxiliary actuating means in the preferred embodiment is by a guide slot in the backing plate through which the auxiliary lever passes and by lug projections on one of the shoes between which the strut extends.

In the past the only braking equipment available to manufacturers of industrial trucks and like equipment have been automotive-type brakes which have proven to have insufficient torque output and wear life. A brake adequate to meet the demands of the winch, construction, mining and bulk material handling fields, such as for lift trucks, must fit small diameter wheels and be rugged enough to handle the shuttle type service of lift trucks and the constant torque reversals encountered in braking installations throughout these fields.

Several features of novelty in the improved brakes reside in structure for obtaining the desired type of brake operation and dependability with small diameter drums. A unique U-shaped return spring is used in place of conventional coil return springs to permit and provide efficient location of the auxiliary brake actuating means. An additional creative aspect of this invention is the construction of a specific mounting structure for the fixed brake shoe abutment that can properly distribute high torque loadings, as in the services previously mentioned, over a large portion of a suitably rugged brake backing plate to minimize detrimental backing plate deflections previously experienced with conventional brake assemblies.

This invention includes a novel floating brake shoe arrangement. The important advantage of a floating brake shoe is that it has no ability to develop a localized, high pressure loading at either end of the lining length and can only assume a position in the drum to create a uniform pressure distribution. The particular position assumed is dependent on factors involving the relative stiffness of the shoe and drum, the abutment location and angle, and the amount of shoe input force. A floating shoe has the freedom to permit these factors to dictate its position rather than to impose on unnatural pressure distribution, drum deflection and lining wear pattern as is the case with a fixed anchor shoe. Briefly, the position of the floating shoe with respect to the drum is dictated by the lining wear pattern and this pattern will be uniform because of the uniform pressure distribution.

A primary object of this invention is, therefore, to provide an improved heavy duty small diameter power actuated hydraulic brake with coacting means for auxiliary mechanical brake actuation.

Another object is to provide a brake assembly having essentially conventional hydraulic actuation for service braking and novel mechanical actuation for parking or holding purposes.

A further object is to provide a novel brake shoe return spring construction and arrangement which permits an efficient unobstructed location of auxiliary mechanical brake actuating mechanism.

Another object resides in the novel arrangement of a strut and lever auxiliary brake actuating means having no positive anchoring connection to the backing plate or the brake shoes.

Another object resides in the provision of floating brake shoes mounted on the support plate in a novel manner which enables conformity to the drum during brake actuation regardless of adjustments for the deactivated state.

A further object resides in provision of a full floating auxiliary mechanical brake actuating means that is self-centered between the brake shoes.

Another object resides in the novel combination of service hydraulic and auxiliary mechanical brake actuating means whereby actuation of one of the actuating means will not cause corresponding actuation of the other actuating means.

A further object is to provide a novel seal between the brake backing plate and brake drum to exclude dust and foreign materials encountered in lift truck service from the interior of the brake.

Another object is to provide novel stress distributing structure to transfer the brake shoe torque loading to the backing plate in a manner to minimize backing plate deflection.

A further object is to provide a novel arrangement between a clip type holding spring and a U-shaped brake shoe return spring which coact with and properly locate each other and function to return the shoes from drum contacting position and to normally hold the shoes against the anchor abutment faces.

Another object is to provide an eccentric cam assembly in novel cooperation with each shoe and which is adjustable to maintain correct running clearance between brake drum and brake shoe.

A further object resides in the novel provision of a spring loaded hold down nail for each brake shoe to maintain frictional engagement between the floating shoe and the backing plate and thereby insure running clearance and keep the shoes from dropping against the side of the drum.

Further objects of the invention will become apparent from the description and the accompanying drawings taken in conjunction with the appended claims.

In the drawings, wherein like reference characters are used to indicate similar parts throughout:

Figure 1 is an end elevation view of the brake with the drum removed for illustrative purposes.

Figure 2 is a partially sectioned view of the brake taken along line 2—2 of Figure 1, and illustrates the abutment mounting, spring cam and actuator details.

Figure 3 is a partially sectioned view taken along line 3—3 of Figure 1, illustrating the auxiliary mechanical braking mechanism.

Figure 4 is a section detail view taken on line 4—4 of Figure 1, and illustrates the cooperation between the adjustment cam and the brake shoe.

Referring now to the drawings and more particularly to Figures 1 and 2, the illustrated embodiment of the brake assembly 10 has a brake drum 12, two internal expandable interchangeable brake shoes 14, a U-shaped brake shoe return spring 16 and a relatively heavy backing plate 18 upon which the brake shoes and the actuating means are supported.

Brake assembly 10 utilizes an internally expandable hydraulic actuating means 20 for power braking action, and may be equipped with an auxiliary hand operated mechanical actuating means 22. A distinctive shoe anchor abutment bracket 24 with greatly extended mounting flanges is fixed to the backing plate as will appear.

Backing plate 18 has a center opening 26 through which an axle beam or axle housing (not shown) extends. The drum 12 is mounted on a wheel (not shown) journalled on the axle beam or housing. Openings 28 are provided for riveting the backing plate upon a suitable radial flange on the axle beam or housing. A rectangular slot 30 is provided through the backing plate for a manually actuated lever 32 which extends through the slot 30 and has an arm 33 located exteriorly of the brake assembly 10. An additional opening 34 in backing plate 18 (Figure 2) is provided for mounting the hydraulic actuator 20. A flanged retainer ring 36, preferably fabricated as a sheet metal stamping, is fixed as by spot welding to the rear face of backing plate 18 slightly inwardly offset from the peripheral margin to hold a felt seal 38 between the backing plate and brake drum 12. This seal protects the brake and brake drum from dust and foreign materials encountered in most industrial service.

Shoe abutment bracket 24 includes two integral, elongated, relatively thick mounting wing flanges 40 fastened to the backing plate 18 by rivets 42. This stiff extended bracket structure is used to distribute torque loading from actuated brake shoes over a relatively large area of the backing plate and thereby minimize localized stresses and backing plate deflection. Abutment bracket 24 is formed with a heavy solid central boss 44 the sides of which present substantially plane shoe abutment surfaces 46. The top 48 of boss 44 is flat except for a riveted over projection 50 which is used to retain a shoe aligning washer 52.

The hydraulic cylinder assembly 20, having a hydraulic coupling 54 and a bleeder valve 56 extending through the backing plate opening 34, is fastened to backing plate 18 by bolt 58 and by screw 60 which is seated in a countersunk backing plate opening 62 (Figure 3). The head of screw 60 lies below the surface of plate 18 to provide clearance for a part of the auxiliary mechanical actuator herein described. Hydraulic cylinder 20 is connected at its ends to the brake shoes in a conventional manner.

As previously noted, the auxiliary mechanical actuating means 22 has no positive anchoring connection to the backing plate 18 or the brake shoes 14. The actuating means 22 comprises essentially lever 32 pivotally mounted to a cross thrust member or strut bar 64 as by stepped rivet 66. The pivotal opening 68 of lever 32 is formed to have a free turning fit on the larger shank 70 of rivet 66 while the smaller diameter portion 72 of rivet 66 is secured non-rotatably to thrust member 64. Lever 32 extends through the slot 30 in backing plate 18 to the exterior of the brake assembly, and through a rectangular slot opening 74 of a spring thrust plate 76. Corners 77 of the thrust plate 76 are beveled to provide symmetry of shape and clearance for drum seal retainer 36. A leaf type compression spring 78 having a rectangular opening 80 fits over the lever end 33 and resiliently abuts the thrust plate 76, being retained in position by a cotter key 82 which extends through a hole 84 in the lever. Both spring 78 and spring thrust plate 76 are movable with lever 32, spring 78 being relatively slidably movable across face 86 of plate 76 which in turn is relatively slidably movable over and with respect to the flat outside face 88 of backing plate 18. Adjacent the pivotal connection between lever 32 and strut bar 64 a short rounded tab 90 projects from strut bar 64 into slot 30 and toward the lever end 33. The free side surface of the lever 32 and of tab 90 slidably engage respectively the upper and lower edges of slot 30 in the backing plate to help maintain alignment of the auxiliary actuating mechanism 22 relative to the backing plate and shoes. The other arm of lever 32 is formed as an enlarged head 92 with a rounded edge 94 for sliding engagement with a thrust edge 96 on the brake shoe web 98 of left brake shoe 14 of Figure 1. This auxiliary mechanical actuating means 22, which is full floating and self-centering between the shoes, has therefore no fixed connection with the brake shoes and hence does not affect the brake shoe adjustment nor will it result in mechanical actuation of the hydraulic mechanism 20. In turn lever 32 is not itself actuated by the brake shoe adjustment or actuation of the hydraulic actuating means 20.

The inner edge 100 of strut bar 64 is flat except for the projecting tab 90 and is slidable across the flat smooth inside surface 102 of backing plate 18. Strut bar 64 extends from its pivotal connection with lever 32 to the right shoe 14 where an integral projection 104 provides an abutment edge 106 for engagement with the thrust edge 96 of the right hand shoe web 98. Extension 108 of the strut 64 projects beyond the projection 104 to a position between aligning lug projections 110 on the backing plate side of the web 98 of right hand shoe 14. Similar sets of projections 110 are provided on both sides of each shoe web 98 for shoe interchangeability and for right and left hand brakes, although only one of the four sets of projections in each brake assembly is actually used. The strut 64 is retained against the backing plate by the shoe web 98 which overlies projection 108 and by the spring thrust plate, leaf spring and cotter pin fastened to lever 32 engaging the exterior of the backing plate. Cross thrust strut bar 64 is extended and beveled at 112 at the left end to insure clearance with respect to the left hand shoe web projections 110 when the brake is deactuated.

The hydraulic cylinder type actuator 20 is illustrated in phantom lines in Figures 1 and 2, to more clearly show the ends of the brake shoes. Webs 98 of shoes 14 are formed with rounded projections 114 which, in assembly, project into the hydraulic cylinder 20 for operative engagement by the respective hydraulic cylinder pistons in the usual manner.

Openings 116 in the webs 98 adjacent projections 114 receive the hooked ends 118 of the U-shaped brake shoe return spring 16, which generally encircles the central axle opening 26 of the backing plate and is substantially coextensive with the inner edges of the shoe webs 98. The bight 119 of spring 16 rests on the outer surface of washer 52. Openings 120 in each shoe web 98, adjacent the fixed abutment ends, are provided to receive the ends of a clip type anchor spring 122 which holds the rockable slidable floating curved abutment end 124 of each shoe web 98 against the respective abutment surfaces 46. Spring 122 passes over the bridge 119 of the U-shaped spring and positions and aligns that spring substantially parallel to the backing plate and the operative path of movement of the brake shoes.

Openings 126 in the brake shoe webs are provided for a hold down nail assembly 128 and are formed oversize with respect to the respective nail shanks 130 to allow relative motion of the shoes. The hold down nail assemblies 128 maintain sliding engagement between shoe table aligning and bearing pads 132 on the backing plate side of the shoe lining platforms 131 and backing plate 18. This ensures that floating shoes 14 maintain running clearance and also prevents the shoes from falling down against the drum. The shoe bearing pads 132 at the abutment end of the shoes are cut away on the inner side 134 to ensure ample clearance with respect to the abutment bracket flanges 40. Openings 136 are provided in backing plate 18 to mount the head end 138 of the hold down nail assemblies 128. A head end 138 semi-universal action in the respective backing plate opening 136 permits floating motion of the shoes in addition to that permitted by oversize openings 126. On the side of each shoe web 98 which faces away from the backing plate 18, each hold down nail assembly 128 is furnished with a compressed coil spring 140 and two spring end retaining cups 142. The outer cup 142 is restrained by nail flange end 144 which passes through rectangular opening 146 and then either the nail or outer cup is turned 90 degrees with respect to the other to lock the nail flange and cup together. The other cup 142 acts merely as a spring end retainer and exerts the resilient force of spring 140 against the respective shoe web 98.

Individual adjustment cam assemblies 154 are incorporated on the backing plate for each brake shoe and independent brake shoe adjustment is obtained by cooperation between an integrally formed adjustment pad 150 on the inner surface of the shoe platform and an eccentric cam 156 of the adjustable cam assembly 154 for that shoe. A surface 152 of the pad 150 contacts the cam 156 when the brake is deactuated. Openings 158 in backing plate 18 permit through passage of a stem 160 of each adjustment member 162 which has an integral hexagonal head 164 located on the exterior side of the backing plate. The rectangular end 166 of adjustment member 162 passes through a rectangular opening 168 in the cam 156 and is swaged or peened over to rigidly mount the cam on stem 160. A compressed coil spring 172, confined between backing plate 18 and the cam 156, holds head 164 and lock washer 174 of each adjustable cam assembly 154 against the backing plate with sufficient force to frictionally maintain cam settings. Cam assemblies 154 provide an adjustment to maintain correct running clearance between the brake drum and the shoe linings which move to conform to the drum 12 at all times upon actuation regardless of adjustment conditions. Adjustment pads are formed on both sides of the shoe web to enable interchangeability of shoes.

When the hydraulic actuator 20 is operated, the brake shoes 14 are rocked about abutment 24 into engagement with drum 12 as in conventional hydraulic brakes. In using the auxiliary mechanical actuating means 22, actuating lever 32 is pulled to the right as by an operating rod 173 connecting lever end 33 to a suitable hand lever available to the operator. This pivots lever 32 about the rivet 66 thereby moving the lever thrust head 94 to the left in Figure 3 and moving left shoe 14 to engage drum 12. The force reaction set up when lever head 94 contacts the left brake shoe web results in floating shift to the right in Figure 3 of bar 64 and the parts carried thereby including pivot 66, lever 32, thrust plate 76 and spring 78 until positive force is applied at the thrust edges 96 of the respective shoe webs, and then further pivotal movement of lever 32 results in the brake shoes pivoting about abutment 24 into engagement with the brake drum. The spring and thrust plate arrangement coacting with the fit of projection 90 into slot 30 and the interfit of the bar extensions 108 with shoe web projections 110 insures that the parts are maintained and guided in optimum operative association during this time. When the pull on rod 173 is released, the spring 16 the arms of which are spread when the shoes are expanded pulls the shoes away from the drum toward the Figure 1 position.

The abutment ends 124 of the brake shoes may slide along the surfaces 46 of the fixed abutment, if necessary, to assume a position whereby the brake shoe lining may conform to the brake drum. Substantially the only time that the abutment ends 124 slide over abutment surfaces 46 is when the brake is first actuated after assembly or repair. As the shoes are moved radially outward for the first brake actuation they floatingly move with a sliding action of abutment ends 124 over the fixed surfaces 46, to substantially conform with the normal actuated elliptical type distortion pattern of the loaded brake drum. Once the shoes have conformed to the elliptical distortion pattern no more sliding of the abutment ends of the shoes is necessary or likely to occur. The washer 52 overlies the lower ends of the shoe webs to retain and help guide them in movement.

There is normally no sliding action of the abutment ends 124 of the brake shoes during deactuation. Running clearance at the shoe ends is provided by the drum changing from an elliptical shape to a circular shape. If this does not supply adequate running clearance, the drum runout, which is always present, will urge the shoe up or down, until clearance exists. The clip spring 122 and hold down spring 140 will create a friction force sufficient to maintain the clearance.

From the foregoing, there is hereby provided an improved, rugged, small diameter power actuated brake which can be used with or without the disclosed auxiliary mechanical brake actuating mechanism. The invention provides a unique U-shaped shoe return spring which leaves space for efficient placing of internal structure such as the auxiliary strut bar and lever brake actuating mechanism. The brake uses a new form of shoe abutment mounting which distributes torque loading transmitted to the backing plate over a wide area to minimize backing plate deflections. The brake uses floating shoes which conform to the drum during brake actuation and provides an eccentric cam adjustment means for each floating shoe to maintain correct running clearance between the drum and each shoe during the deactuated state. It provides an auxiliary mechanical brake actuating mechanism which is independent of the hydraulic actuator and is full floating and self-centering between the shoes and which is operated separately from and will not affect brake adjustment or cause operation of the hydraulic power actuator of the brake and in turn is not moved by brake adjustment nor operation of the power actuating means. The invention also provides a novel seal between backing plate and drum to protect the interior of the brake from dust and foreign materials.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. In a brake mechanism for use with a rotatable drum, a support, abutment means on said support, brake shoes pivotally mounted on said abutment means for movement toward and away from said drum, actuating means on said support operatively connected between said shoes for moving said shoes toward engagement with said drum, a substantially U-shaped spring connected to normally urge said shoes away from said drum, said spring comprising spaced legs connected at their free ends to said shoes and a bridge portion overlying said shoes adjacent said abutment means, and an anchor spring overlying said bridge portion interconnecting said shoes adjacent said abutment.

2. In a brake assembly, a support having a fixed abutment formed with similar brake shoe abutment faces on opposite sides, two brake shoes having webs with adjacent ends rockably and slidably bearing on said faces and having lining platforms formed on their edges for slidably bearing on said support, means laterally resiliently urging said shoes against said support, resilient means maintaining said shoes in bearing contact with said faces, retainer means on said abutment overlying the adjacent ends of the shoe webs, an actuator operatively connected between the other ends of said shoes, and a return spring having an intermediate portion overlying said retainer means and underlying said resilient means and opposite end legs connected to said shoes adjacent said actuator.

3. In a brake assembly having a backing plate, an abutment rigid with said backing plate, an actuator mounted in spaced relation on said backing plate, two brake shoes adjacently operatively connected to said actuator, each shoe comprising a lining platform slidable over said backing plate and a web fulcrumed on said abutment, a retainer member on said abutment extending over the adjacent shoe webs, means acting on said shoe webs laterally resiliently urging said shoe platforms toward said backing plate, a substantially U-shaped shoe return spring disposed with its bridge overlying said retainer member and its ends connected to the shoes adjacent said actuator, and an anchor spring connected between the shoe webs adjacent said abutment and overlying the bridge of the return spring.

4. In a brake assembly, a support, abutment means on said support, brake shoes pivoted at adjacent ends on said abutment means, each shoe comprising an arcuate flange slidable over said support and a web having one end engaged with said abutment means, means acting on said web flexibly urging said shoe flange against said support, a substantially U-shaped shoe return spring having the free ends of its legs attached to the other ends of said shoes, said U-shaped return spring being disposed substantially parallel to said shoes and substantially following the general contour of the shoes and overlying said shoes at said abutment means, and an anchor spring interconnecting the ends of said shoes adjacent said abutment means and overlying the bridge portion of said U-shaped spring.

References Cited in the file of this patent

UNITED STATES PATENTS

| 1,930,718 | Kohr | Oct. 17, 1933 |
| 1,998,676 | LaBrie | Apr. 23, 1935 |
| 2,118,188 | Gallup | May 24, 1938 |
| 2,165,760 | Parnell | July 11, 1939 |
| 2,287,239 | Goepfrich | June 23, 1942 |
| 2,351,952 | Goepfrich | June 20, 1944 |
| 2,385,540 | Rasmussen | Sept. 25, 1945 |
| 2,463,008 | White | Mar. 1, 1949 |
| 2,481,144 | Neale | Sept. 6, 1949 |
| 2,509,643 | House | May 30, 1950 |
| 2,718,284 | Anderson | Sept. 20, 1955 |
| 2,775,316 | Scheel | Dec. 25, 1956 |

FOREIGN PATENTS

| 766,692 | France | Apr. 16, 1934 |